(12) United States Patent
Arnold

(10) Patent No.: US 6,456,853 B1
(45) Date of Patent: Sep. 24, 2002

(54) METHOD OF ESTABLISHING A RADIO LINK BETWEEN NETWORK SUBSCRIBERS AND UTILIZING ASSIGNED POSITION IDENTIFICATIONS

(75) Inventor: Jörg Arnold, Heidelberg (DE)

(73) Assignee: IP2H AG, Bern (CH)

( * ) Notice: Subject to any disclaimer, the term of this patent is extended or adjusted under 35 U.S.C. 154(b) by 0 days.

(21) Appl. No.: 09/202,557

(22) PCT Filed: Jun. 25, 1997

(86) PCT No.: PCT/DE97/01317

§ 371 (c)(1),
(2), (4) Date: Dec. 16, 1998

(87) PCT Pub. No.: WO97/50195

PCT Pub. Date: Dec. 31, 1997

(30) Foreign Application Priority Data

Jun. 25, 1996 (DE) .......................................... 196 25 291

(51) Int. Cl.⁷ ................................................ H04Q 7/20
(52) U.S. Cl. ...................... 455/456; 455/11.1; 455/13.1
(58) Field of Search ................................ 455/432, 433, 455/435, 13.1, 414, 520, 404, 519, 456, 521, 463, 461, 7, 9, 10, 11.1

(56) References Cited

U.S. PATENT DOCUMENTS

| 3,457,075 | A | | 7/1969 | Morgan et al. ................. 96/67 |
|---|---|---|---|---|
| 4,284,848 | A | * | 8/1981 | Front .......................... 455/550 |
| 4,539,706 | A | * | 9/1985 | Mears et al. ................ 455/11.1 |
| 5,095,529 | A | * | 3/1992 | Comroe et al. ................ 455/34 |
| 5,133,080 | A | * | 7/1992 | Borras ............................ 455/9 |
| 5,257,405 | A | | 10/1993 | Reitberger |
| 5,337,344 | A | * | 8/1994 | Alvesalo ..................... 455/33.1 |
| 5,408,679 | A | * | 4/1995 | Masuda ..................... 455/11.1 |
| 5,408,683 | A | * | 4/1995 | Ablay et al. ................ 455/33.1 |
| 5,467,381 | A | * | 11/1995 | Peltonen et al. ............. 455/403 |
| 5,481,588 | A | * | 1/1996 | Rickli et al. ................ 455/67.1 |
| 5,628,049 | A | * | 5/1997 | Suemitsu ...................... 455/101 |
| 5,673,308 | A | * | 9/1997 | Akhavan ....................... 379/61 |
| 5,757,783 | A | * | 5/1998 | Eng et al. ................... 455/31.1 |
| 5,790,938 | A | * | 8/1998 | Talarmo .................... 455/11.1 |
| 5,907,794 | A | * | 5/1999 | Lehmusto et al. .......... 455/11.1 |
| 5,973,614 | A | * | 10/1999 | Yoshida et al. ............. 455/11.1 |
| 6,075,993 | A | * | 11/2000 | Kawamoto ................... 455/456 |

FOREIGN PATENT DOCUMENTS

| DE | 33 37 648 A1 | 2/1987 |
|---|---|---|
| DE | 195 35 021 | 7/1997 |
| DE | 196 08 846 | 11/1997 |
| EP | 0459236 | 12/1991 |
| EP | 0663737 | 7/1995 |
| EP | 0754969 | 1/1997 |
| GB | 1342525 | 1/1974 |
| GB | 2285724 | 7/1995 |
| GB | 2309843 | 8/1997 |
| JP | 07260920 | 10/1995 |
| WO | WO94/29995 | 12/1994 |

OTHER PUBLICATIONS

Patent Abstracts of Japan, vol. 096, No. 002, Feb. 29, 1996.

* cited by examiner

Primary Examiner—Edward F. Urban
Assistant Examiner—Tilahun Gesesse
(74) Attorney, Agent, or Firm—Alston & Bird LLP

(57) ABSTRACT

A method of establishing a radio link between at least two network subscribers of a digital relay radio network is designed with respect to establishing in a simple manner a radio link, even in a network without stationary relay stations, such that the individual network subscribers are assigned an individual, location-dependent position identification, so that the position of network subscribers is determined relative to one another.

16 Claims, 2 Drawing Sheets

METHOD OF ESTABLISHING A RADIO LINK BETWEEN NETWORK SUBSCRIBERS AND UTILIZING ASSIGNED POSITION IDENTIFICATIONS

BACKGROUND OF THE INVENTION

The invention relates to a method of establishing a radio link between at least two subscribers of a digital relay radio network.

Methods of the kind under discussion are known in connection with radio networks, such as, for example, C, D1, D2, and E-plus mobile radio networks. To this end, the known networks comprise stationary radio equipment in the form of relay stations. The establishment of a radio link occurs by means of external switching methods within the scope of an external radio network management. In these mobile radio networks, the localization of the subscribers and the connection between the subscribers occurs by means of a central switching equipment.

When establishing a radio link, the central relay stations play a basic role, since they are in a constant mutual contact with the network subscribers, in that the radio network area is divided into individual network cells. Thus, the location of the network subscriber is always known to the respective relay station as a result of its response to the relay station, and furthermore to the network central.

When a radio link is established between two network subscribers, same are initially localized by means of the central switching method. Subsequently, the radio link between the network subscribers is computed or determined and then offered. The preliminary computation or determination of the connection path via possible stages is named "routing."

The known methods operate between mobile radio sets and stationary relay stations of the respective cells of the known radio networks. Thus, in the case of the known radio networks, it is essential that externally and centrally controlled methods be applied, which are essentially used by an external operator station—for example, a central operational computer—outside of the individual mobile radio sets or radio terminals.

The known methods of establishing a radio link within the known radio networks, present the problem that the establishment of a radio link always requires stationary transmission relays or relay stations. From this follows, that when a radio network of the known type is set up or newly build up, it will first be necessary to build up an area covering network of stationary relay stations. This greatly reduces the flexibility of a network system with respect to a new implementation.

It is therefore the object of the present invention to describe a method of establishing a radio link of the kind under discussion, which facilitates in a simple manner establishing a radio link even in a network without stationary relay stations.

SUMMARY OF THE INVENTION

The above and other objects and advantages of the present invention are achieved by the provision of a method of establishing a radio link between at least two network subscribers, wherein an individual location dependent position identification is assigned to each of the individual network subscribers so that the position of all network subscribers may be determined relative to each other.

As a result of assigning position identifications relative to one another it is possible to build up in steps a radio link from network subscriber to network subscriber. It is no longer necessary to provide separate, stationary relay stations. To build up a radio link, a source subscriber must know only its own position identification and the position identification of the destination subscriber. The radio link will then be established between the source subscriber and the destination subscriber via further network subscribers that are able to retransmit in a purposeful manner, due to the knowledge of their own position identification, a radio signal that is emitted by the source subscriber to the destination subscriber.

A relay radio network in which the method of the present invention may be used is known from German Patent Application 195 35 021.9. This Application discloses a relay radio network that consists of individual, mobile radio sets, which serve both as terminal equipment and as a relay. As a result of assigning a position identification in accordance with the invention, it is possible to address in the known relay radio network the network subscribers in a location-dependent and direction-dependent manner and to interconnect same in a destination-directed or directional manner.

In the invention, localization of the network subscriber and assigning a radio path between the network subscribers are not exactly realized by means of stationary relay stations and established radio network cells. While building up the radio link, the direction of the radio path to the desired destination subscriber is predetermined by determining in steps, with a tendency in terms of direction, successive stages of the radio path via further network subscribers. While the radio link is built up or offered, same is definitively determined only when the last stage of the radio path is established. This may result in that possibly several stages of the radio path are selected simultaneously, and that a multipath propagation occurs or a plurality of parallel radio links build up.

Consequently, the method of the present invention specifies a method of establishing a radio link, which facilitates in a simple manner establishing a radio link even in a network without stationary relay stations.

As regards a simple buildup of a radio link, it will be advantageous, when the network subscribers participating in a setup of a radio link know their position identification for comparison with the position identification of other network subscribers. To this end, the respective network subscribers could store the position identification assigned to a network subscriber.

With respect to an especially simple assignment of position identifications, it would be possible to determine the position relative to radio signal emitting signal transmitters with a predeterminable location. To this end, at least three radio signal transmitters may be provided. The radio signal transmitters could emit the radio signals at certain instants or after certain time intervals. As a result of receiving the radio signals by the predeterminable locations, it becomes possible to determine in a simple manner the position of the receiving network subscriber relative to the radio signal transmitters. This enables a clear position identification and a clear assignment of a position identification.

A particularly reliable assignment of location-dependent position identifications. could be realized, when the radio signal transmitters are arranged distributed over the radio network area at the boundary thereof. In this instance, the radio signal transmitters may not be collinear.

As regards a reliable transmission or a reliable reception of the radio signals, the network subscribers could receive the radio signals transmitted directly from the radio signal transmitters or via other network subscribers. In other words, all network subscribers are also used as transmitters of the radio signals for assigning a position identification. In this connection, the radio signals of the signal transmitters could be retransmitted like an avalanche by the network subscribers serving as transmitters.

Having in mind a particularly clear distinction of the radio signals from different signal transmitters, the radio signals from the signal transmitters could be retransmitted during the retransmission at a transmitter-dependent or predeterminable delay time. This would make it possible to clearly improve the resolution of received radio signals from spatially closely adjacent radio signal transmitters that transmit, however, via different network subscribers.

The radio signal transmitters could transmit radio signals at certain time intervals, possibly monthly, or even at substantially shorter time intervals. The radio signals could be time synchronization signals, which are retransmitted like an avalanche by all transmitters in the relay radio network. Such an avalanchelike retransmission could occur according to the radio reception procedure without relay switching, as disclosed in German Patent Application 196 08 846.1. In this case, each radio signal transmitter transmits individually, and all radio signal transmitters transmit one after the other, for example, at a certain programmed instant or after a certain time interval.

During the retransmission in the radio network area, the radio signals of the signal transmitters could undergo, with respect to a particularly good distinction of the origin of radio signals, location-dependent and/or direction-dependent manipulations of their information content. Besides the better distinction with respect to the origin of radio signals, it is then also possible to assign a particularly distinctive position identification. Such a manipulation could comprise a transit time delay.

With respect to communication of information between the transmitters, the radio signals of the signal transmitters could also transmit, during the transmission by the network subscribers, further data from the network subscribers that serve as transmitters.

Having in mind a particularly clear distinction of the radio signals from different signal transmitters, the radio signals of the different signal transmitters could be physically distinguished from one another by the network subscribers with respect to a different radio frequency, and/or a different logic coding, and/or a different information content, and/or a different time duration, and/or a different transmission sequence. In this connection, it is in principle essential that the network subscribers be able to determine clearly the radio signal transmitter, from which each received radio signal originates.

Each transmitter which receives radio signals of different signal transmitters in a certain time sequence thus receives a signal sequence that is dependent on the location of the receiver. From the time intervals of the incoming radio signals, is its possible to determine clearly the location of the receiver. The position identifications assigned to the network subscribers develop because of relay delays as a function of location and direction within the network area.

In the presence of, for example, three radio signal transmitters, the radio signal of the first signal transmitter could arrive, taking into account relay delays, after one second at the respective network subscriber, the radio signal of the second signal transmitter after three seconds, and the radio signal of the third signal transmitter after five seconds. From this, it would be possible to generate a position identification of 1-3-5.

A further possibility of generating a position identification could be derived within the radio signal from an increase of a registration value or argument, which increase is dependent on the number of transmissions. In other words, a numerical value is increased by, for example, 1 during each transmission of the respective radio signal. In the presence of, for example, three radio signal transmitters, a position identification could consist of the respective number of the transmissions of the respective radio signal, as follows. For example, if the first radio signal has completed three transmissions, the second radio signal ten transmissions, and the third radio signal twenty transmissions, a position identification of 3-10-20 would be possible. Thus, during the retransmission in the radio network area, the radio signals of the signal transmitters could undergo a location-dependent and/or direction-dependent change in registration arguments that contain the radio signals, through a continued registering by the respective transmitters. In other words, a location-dependent and direction-dependent differentiation of the position sequences is attained. In this connection, each transmitter chronologically counts or continues to count during the transmission a step number, and modifies or adds same as an information constituent in the transmitter signal. Because of the continued counting of the step number, these position identifications develop over the network area as a function of location and direction.

It would be possible to attain a third possibility of position identification, if the radio signal transmitters consisted of satellites of the ground positioning system (GPS). In this system, the network subscribers receive as signals their absolute geographic position. Same consists of the parameters geographic latitude and geographic longitude. In this instance, the position identification could consist only of geographic position data that are received via the GPS.

For purposes of realizing the position identification by means of the GPS, it will be necessary to make the equipment hardware more expensive than for the reception from radio signal transmitters arranged in the network. However, this system makes the avalanchelike setup of the position identification system unnecessary and thereby reduces the load of the network considerably. The use of the GPS for localizing the network subscribers offers a high spatial resolution, which would also enable a reliable location of the network subscribers in emergency situations for assistance by first-aid services, rescue services, etc. A direct guidance of such emergency services to the location of the network subscriber would thus be possible in a simple manner.

As previously mentioned, the radio signals of the signal transmitters could generate upon reception by the network subscriber a certain, location-specific time sequence in the form of a position sequence for forming the position identification. In this connection, it is essential that individual network subscribers do not receive the radio signal emitted from a signal transmitter repeatedly, possibly, via several transmitters. This would no longer allow a clear position identification. To avoid the occurrence of such multiple signals at a network subscriber, it would be possible to apply a radio reception procedure, as previously disclosed in Applicant's German Patent Application 196 08 846.1.

Advantageously, the position identification could be a routing code comparable to a zip code. The formation of such a routing code has previously been described above. The routing code could consist of a character sequence and/or a sequence of numbers, which can be directly derived from the position sequence or from the time sequence of the radio signals arriving from different signal transmitters. In this connection, the sequence of numbers of the routing code could consist of the numerical values of the time differences in the different radio signals from the signal transmitters relative to one another or relative to a certain reference signal of the radio signal upon reception by the network subscribers.

As an alternative, the sequence of numbers of the routing code as previously described - could consist of the numerical values of the registration arguments, in particular step numbers during the retransmission of the different radio signals of the signal transmitters. In a further alternative, the sequence of numbers of the routing code could consist of the numerical values of geographic position data, in particular the geographic longitude and geographic latitude which are received by the network subscribers. These routing codes could be assigned to the network subscribers at the location of their reception as addresses in the radio network area. Thus, the routing codes could form a location-dependent and direction-dependent system of routing codes. When starting or establishing the radio link, the network subscribers could address the desired destination subscribers with these routing codes.

For establishing the radio link, it is essential that the network subscribers know their own position identification as well as the position identifications of the source subscriber and the destination subscriber. This would enable a network subscriber serving as a transmitter and being addressed when a radio link is established between a source subscriber and a destination subscriber, to compare with one another its routing code, the routing code of the destination subscriber and the routing code of the source subscriber or, if need be, the previous transmitter, and to decide thereafter, whether it performs a retransmission. In other words, an addressed network subscriber or transmitter compares with one another the destination subscriber identification, the source subscriber identification, and its own identification. In this process, the transmitter checks, whether its own position identification is closer to the destination subscriber identification than the position identification of the source transmitter. If so, it will retransmit. Otherwise, retransmission via same will be discontinued. In case of its further transmission, the transmitter is closer to the destination subscriber than its source transmitter. A further transmission by the transmitter will no longer be useful, when same is further removed from the destination subscriber than the respective source transmitter. In the latter case, the source transmitter itself will continue to transmit. This principle allows to establish the desired radio link successively.

The comparison and/or decision making process could be based on a similarity comparison of the routing codes, in particular a fuzzy logic decision making process.

To generate alternative communication paths and, thus, a particularly reliable communication, it would be possible to generate a multipath propagation, when the radio link is offered.

Should the GPS be used for assigning a position identification to the network subscribers, the position identification or the routing code may consist of, for example, the geographic longitude and latitude. These geographic position data, or even a different kind of position identification and/or a routing code could be automatically transmitted along from the source subscriber to the destination subscriber, when the radio link is offered. As a result, it would be possible to realize an, automatic information of first-aid and/or rescue services such as, for example, the ADAC (General German Automobile Association). This would enable a simplified location of the source subscriber, for example, in an emergency situation, in which the source subscriber either does not know its exact position or is no longer able to transmit same correctly because of great excitement or health impairment. When establishing a radio link, such an automatic position determination could also be provided in known radio network systems. This could be realized, for example, by implementing a GPS chip in a conventional mobile telephone.

The application of the method according to the invention for establishing a radio link could also occur in conventional mobile telephone networks of the above described kind. In this instance, it would not be necessary to provide stationary relay stations in the case of a corresponding position identification of the network subscribers. This would make a central network management unnecessary.

BRIEF DESCRIPTION OF THE DRAWINGS

Referring to the accompanying drawings.

DETAILED DESCRIPTION OF THE PREFERRED EMBODIMENTS

Figure 1:
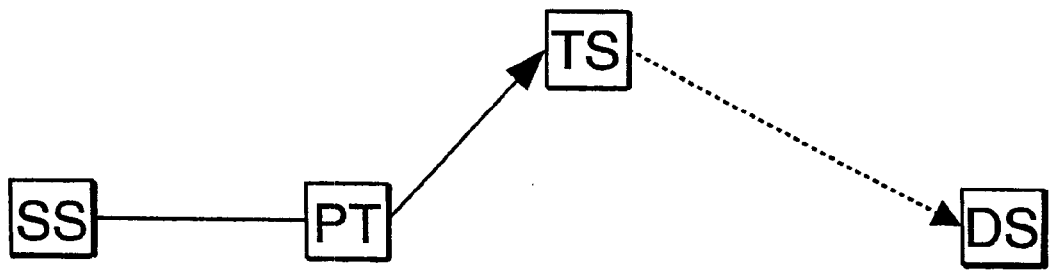
FIGS. 1 and 2 show two different cases of positional relationship between a source subscriber SS, a previous transmitter PT, an addressed transmitter subscriber TS, and a destination subscriber DS.

Referring more particularly to the drawings, FIG. 1 illustrates the situation where the position identification of the addressed subscriber TS is closer to the position identification of the destination subscriber DS than to the position identification of the source subscriber SS and the previous transmitter PT. In this case, the addressed subscriber TS will perform a retransmission for establishing the radio link.

Figure 2:
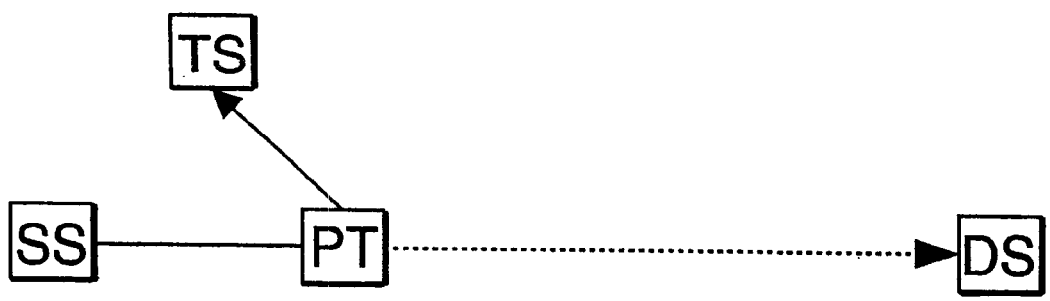

In the situation of FIG. 2, the position identification of the addressed subscriber TS is not closer to the position identification of the destination subscriber DS than to the position identification of the previous transmitter PT. In this event, no retransmission will be performed by the addressed subscriber TS, and the transmission will be continued via the previous transmitter PT for establishing the desired radio link.

In the very first phase of the establishment of the radio link the source subscriber SS addresses a subscriber TS for establishing the radio link directly. In this case the comparison of the position identifications will happen under the addressed subscriber TS, the destination subscriber DS and the source subscriber SS. If the position identification of the addressed subscriber TS is not closer to the identification of the destination subscriber DS than the position identification of the source subscriber SS no retransmission will be performed. Then, another subscriber will be addressed by the source subscriber SS.

Figure 3:
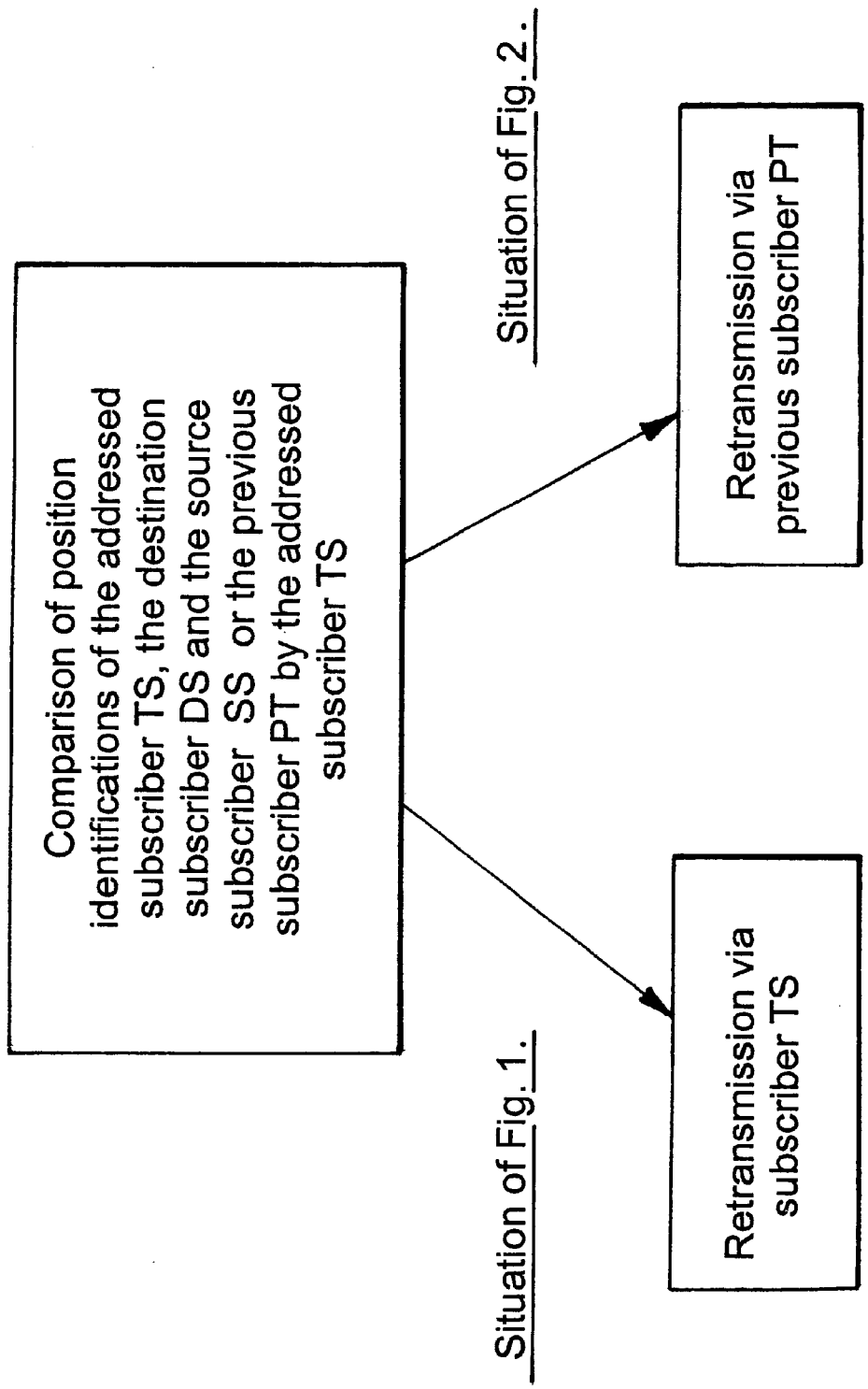
FIG. 3 is a flow diagram illustrating the two alternatives according to FIGS. 1 and 2.

FIG. 3 is a flow diagram which illustrates the alternatives of FIGS. 1 and 2 as described above.

In the following, an embodiment of a possible method with respect to the similarity comparison is described, which must be performed by an addressed transmitter, so as to decide whether it should continue to participate in establishing the radio link, or whether it is more advantageous to discontinue same.

To begin with, a source subscriber sends its radio call for making a connection with the necessary radio parameters A to its transmitter environment of its send-receive range or contraction range. The parameters A contain as a part of the source identification A2 the position sequence or position identification $A_{2Q}$: $(q_1, \ldots, q_n)$, and as a part of the destination subscriber identification A1: $(z_1, \ldots, z_n)$. These position sequences or position identifications consist of the sequence of time intervals, or step number sequence, or sequence of geographic parameters or position data of groundbased or satellite-based signal transmitters. The identification A1 of the destination subscriber is known to the user or source subscriber from a kind of telephone directory with all position identifications of the destination subscribers. Such a telephone directory may also be available in the form of an electronic memory at the source subscriber. The telephone directory is actualized after each assignment procedure of the position identification. This assignment procedure may occur daily, hourly, or at still shorter time intervals. By way of example, the method is described in the following only by means of the step number parameters $q_n$ and $z_n$. However, it is possible to apply the method to the previously mentioned kinds of position identifications in like manner. The respectively used application can be checked with respect to technical and economical aspects.

The addressed, reachable transmitters now compare each position $z_n$ of the routing code or identification A1 of the destination subscriber with the corresponding position $q_{z_n}$ of their own routing code $A_{2Z}$ and with the corresponding position $q_{Q_n}$ of the routing code $A_{2Q}$ of the source subscriber or previous transmitter. To this end, the mathematical step number difference sequences $D_{A1,A2Z}$, $D_{A1,A2Q}$ between the step number sequences $A_1$ and $A_{2Z}$, $A_{2Q}$ are formed:

$$D_{A1,A2Z}:(d_n^{A1,A2Z})=D_{A1,A2Z}:(z_1-q_{z1}, \ldots, Z_n-q_{zn})$$

$$D_{A1,A2Q}:(d_n^{A1,A2Q})=D_{A1,A2Q}:(z_1-q_{Q1}, \ldots, Z_n-q_{Qn}).$$

The differences $d_n$ are mapped by the function F, and the images $F(d_n)$ are added in S.

$$F(d_n)=1 \text{ for amount } (d_n^{A1,A2Z}) \leq \text{amount } (d_n^{A1,A2Q})$$

$$F(d_n)=0 \text{ for amount } (d_n^{A1,A2Z})=\text{amount } (d_n^{A1,A2Q})$$

$$F(d_n)=-1 \text{ for amount } (d_n^{A1,A2Z}) \geq \text{amount } (d_n^{A1,A2Q})$$

The sum S of the function values $F(d_n)$ of the difference sequences of the step number sequences $$S=\text{Sum}_{n=0 \text{ to } n=s}(F(d_n))$$

then furnishes the measure for the decision of a transmitter to retransmit the radio call. The adding limit s is the number of the radio signal transmitters used in the network area. If the measure S is positive, a transmitter will basically be able to retransmit the radio call. It will not do so in the case of a neutral or negative measure S. When the transmitters return their result from the routing code comparison to the respective source—source subscriber or previous transmitter—the source subscriber or previous transmitter will select the transmitter with the greatest possible measure, and select in a purposeful manner for transmitting the radio call within the scope of a one-way propagation. If in each case the reachable transmitter with the greatest decision measure in the transmission is selected, a particularly purposeful spatial link will be established without the presence of multipath propagations.

This radio communication method prevents an avalanchelike radio contact pickup. The radio contact pickup occurs instead in a spatially purposeful manner. Depending on the decision making process, it may be designed as a multipath propagation or as a purposeful one-way propagation. In the present radio communication method, the source subscriber need to know only the position identification of the destination subscriber.

The position identification of a destination subscriber is again renewed or modified after a renewed radio signal transmission and transmitted to the transmitters and source subscribers in an already offered radio link.

In the method of the present invention, addressing in a relay radio network may be composed of a network subscriber-specific address part and a location-specific address part.

The invention also supports existing radio links for mobile and moving network subscribers. When the moving network subscriber is reached in an initial radio contact, it is localized at the same time, since a position identification or routing code is also transmitted in the radio traffic according to the protocol. This enables the network subscribers to compute or extrapolate the developments of the position identifications or routing codes, and to direct the radio link by means of routing code addressing to the nearest location of the destination subscriber.

The problem of moving network subscribers and of thus having to correct the radio communication path, if need be, can be avoided, in that the network subscriber has a telecommunication device, which consists of a stationary relay and a mobile terminal. In this instance, the relay could be provided with the position identification and individually close the radio communication path to the terminal despite the movement of the terminal. Thus, the relay would always be available as a stationary addressing point for radio links in the meaning of a home relay, Finally, it should be quite especially emphasized that the foregoing, merely arbitrarily selected embodiments of assigning a position identification serve to explain only the teaching of the present invention, however, without limiting same to these embodiments.

I claim:

1. A method of establishing a radio link between at least two network subscribers of a digital relay radio network, wherein an individual position identification is assigned to each of the individual network subscribers so that the position of all network subscribers may be determined relative to each other, and wherein each network subscriber knows its own position identification as well as the position identifications of a source subscriber (SS) and a destination subscriber (DS), and with each network subscriber including a transmitter, and comprising the steps of addressing a mobile network subscriber (TS) with a radio signal from the source subscriber (SS) or a previous network subscriber (PT), comparing the position identification of the addressed network subscriber (TS) with the position identification of the source subscriber (SS) or the previous network subscriber (PT), and with the position identification of the destination subscriber (DS), and determining whether the position identification of the addressed subscriber (TS) is closer to the position identification of the destination subscriber (DS) than to the position identification of the source subscriber (SS) or the previous subscriber (PT), and if so then causing the addressed subscriber (TS) to retransmit the radio signal from the source subscriber (SS) or the previous subscriber (PT), and if otherwise causing no retransmission from the addressed subscriber (TS) but a continuation of the transmission via the source subscriber (SS) or the previous subscriber (PT).

2. The method as defined in claim 1 wherein the position identification of each network subscriber unit is stored by the respective network subscriber unit.

3. The method as defined in claim 1 wherein the position identification of each network subscriber unit is determined from the signals from a plurality of radio transmitters having predetermined locations.

4. The method as defined in claim 3 wherein the radio transmitters each emit radio signals in defined time intervals.

5. The method as defined in claim 3 wherein the signals from the radio transmitters are retransmitted like an avalanche by the transmitters of the network subscriber units.

6. The method as defined in claim 3 wherein the signals from the radio transmitters are retransmitted at a subscriber unit dependent or predetermined time delay.

7. The method as defined in claim 3 wherein the signals from the radio transmitters are retransmitted by the transmitters of the network subscriber units and undergo a location dependent and/or direction dependent manipulation of their information content during their retransmission.

8. The method as defined in claim 3 wherein the signals from the radio transmitters are retransmitted by the transmitters of the network subscriber units and undergo a location dependent and/or direction dependent transit time delay during their retransmission.

9. The method as defined in claim 3 wherein the radio signals of the plurality of radio transmitters are distinguishable from one another by the network subscriber units with respect to different radio frequencies, and/or different logic codings, and/or different information contents, and/or different time durations, and/or different transmissions sequences.

10. The method as defined in claim 3, wherein the radio transmitters are located on satellites of a ground positioning system (GPS).

11. The method as defined in claim 10 wherein the position identification of the network subscriber units comprises geographic position data received from the ground positioning system (GPS).

12. The method as defined in claim 3 wherein the position identification of the network subscriber units comprises a sequence of numbers which indicate the time differences of the plurality of radio transmitters relative to one another or relative to a certain reference signal of the radio signals upon receipt by the network subscriber units.

13. The method as defined in claim 3 wherein the position identification of the network subscriber units comprises a sequence of numbers which indicate a geographic position which includes longitude and latitude upon receipt by the network subscriber units.

14. The method as defined in claim 3 wherein the position identifications of the network subscriber units are assigned at the location of their reception as addresses.

15. The method as defined in claim 1 wherein the previous network subscriber (PT) comprises a mobile network subscriber.

16. The method as defined in claim 15 wherein the step of addressing a mobile network subscriber (TS) includes transmitting a radio signal from the source subscriber (SS) to the previous network subscriber (PT) and re-transmitting the radio signal from the previous network subscriber (PT) to the mobile network subscriber (TS).

* * * * *